(12) United States Patent
Bloom et al.

(10) Patent No.: US 6,394,794 B2
(45) Date of Patent: May 28, 2002

(54) MODULAR FURNACE SYSTEM

(75) Inventors: David Bloom, Nashua; Robert Bouchard, Litchfield, both of NH (US); David S. Harvey, Littleton; Geoffrey C. Neiley, III, Medford, both of MA (US); Donald A. Seccombe, Jr., Mystic, CT (US); Terrance Wong, Waban; Richard Tarczon, Bradford, both of MA (US); Stephen J. Parrott, Derry, NH (US); Paul Edgington, Cambridge, MA (US)

(73) Assignee: BTU International, Inc., North Billerica, MA (US)

( * ) Notice: Subject to any disclaimer, the term of this patent is extended or adjusted under 35 U.S.C. 154(b) by 0 days.

(21) Appl. No.: 09/778,976

(22) Filed: Feb. 2, 2001

Related U.S. Application Data
(60) Provisional application No. 60/179,664, filed on Feb. 2, 2000.

(51) Int. Cl.[7] ............................... F27B 9/02; F27B 9/12
(52) U.S. Cl. .................. 432/128; 432/145; 432/152; 110/336
(58) Field of Search ................ 432/128, 144, 432/145, 152, 173, 176, 199, 233; 110/336; 52/506.01, 506.02, 506.06; 384/476

(56) References Cited

U.S. PATENT DOCUMENTS

| | | | | |
|---|---|---|---|---|
| 2,202,424 A | * | 5/1940 | Hough | 384/476 |
| 2,656,973 A | | 10/1953 | Sutherland | 230/209 |
| 4,627,814 A | | 12/1986 | Hattori et al. | 432/128 |
| 4,834,646 A | | 5/1989 | Terashima | 432/4 |
| 5,141,147 A | | 8/1992 | Yokota | 228/219 |
| 5,372,499 A | | 12/1994 | Motomura et al. | 432/176 |
| 5,405,074 A | | 4/1995 | Den Dopper et al. | 228/42 |

OTHER PUBLICATIONS

Are you ready for Lead–free Reflow?, Marc Peo and Don DeAngelo, SMT, May 2000, p. 67 ff.

* cited by examiner

*Primary Examiner*—Gregory Wilson
(74) *Attorney, Agent, or Firm*—Weingarten, Schurgin, Gagnebin & Lebovici LLP

(57) ABSTRACT

A modular furnace is fabricated from at least one module having a frame, a removable cover mounted to the frame, exterior cover panels on the frame, and an insulated case fastened to the interior of the module. A conveyor assembly extends through the module. A plurality of process zones, such as heating and cooling zones, are disposed within the module. Field replaceable universal blower assemblies are associated with each process zone. The motor shaft in each blower assembly is provided with a sealed bearing in the motor housing. Insulation within each module is held in place by gas permeable fabric covering large vent openings in cover panels to allow oxygen to diffuse out of the insulation rapidly upon start up.

37 Claims, 13 Drawing Sheets

MODULAR FURNACE SYSTEM

CROSS REFERENCE TO RELATED APPLICATIONS

Benefit is claimed under 35 U.S.C. §119(e) of U.S. Provisional Application No. 60/179,664, filed Feb. 2, 2000, the disclosure of which is incorporated herein by reference.

STATEMENT REGARDING FEDERALLY SPONSORED RESEARCH OR DEVELOPMENT

N/A

BACKGROUND OF THE INVENTION

Convection furnaces are used for the reflowing of solder in the surface mounting of electronic devices to circuit boards. In such furnaces, boards, having preformed solder and/or solder-paste patterns on the boards and devices, travel on a conveyor through a plurality of heating zones. Circulating gas in the furnace is heated by convection heaters above and below the conveyor and impinges on the boards and devices to heat the solder to the reflowing temperatures. The gas is typically circulated by a gas moving device, such as a fan. A cooling section downstream of the heating zones is generally used to cool the boards down from the reflowing temperature. Such furnaces are typically custom built to a customer's specifications. Each of the heating and/or cooling zones is housed in an integral, insulated housing.

The heating zone of a furnace typically includes a hot air plenum comprising a plenum box that includes an orifice plate for diffusing the flow of hot gas over the product. A heating element and various other components, such as safety switches are housed within the plenum box. The hot air plenum is typically designed as a field-replaceable unit, so that the entire hot air plenum can be removed by unfastening a minimum number of fasteners and electrical connections. In this manner, if a component, such as a heater or blower motor, within the hot air plenum fails or the hot air plenum needs to be upgraded, the entire hot air plenum is removed and another hot air plenum installed in its place. This procedure minimizes process line downtime and the mean time to repair. Due to the large size and weight of the field replaceable unit, however, maneuvering the unit out of the furnace, particularly from the bottom part of the process chamber, can be difficult, especially for a single individual.

In most cases, the motor driving the blowers is located outside the furnace enclosure to protect the motor from heat and process gasses. In such cases, a shaft, often the motor shaft, penetrates the furnace enclosure to the blower, and a seal around the shaft keeps gas and heat within the enclosure and away from the motor. The shaft seal typically consists of mechanical contact seals on the shaft, or in some cases, one or more bearings surrounding the shaft independent of the motor, with purging chambers or other means to ensure separation of the enclosed and outside atmospheres.

Nitrogen, $N_2$, is often used as an inerting gas to improve process yields in the reflow soldering of printed circuit boards. Upon start-up, oxygen, $O_2$, in the process chamber is purged out until the $N_2$ is at the desired level for the process. Besides the gas in the process tunnel, there is a large amount of $O_2$ in the thermal insulation in the furnace housing. While it is easy to displace $O_2$ in the tunnel with $N_2$, $O_2$ within the insulation is trapped behind metal insulation covers, which are necessary to prevent product contamination by insulation fibers. Unaided, the furnace takes a long time before the $N_2$ level reaches the desired level, because the $O_2$ diffuses out of the insulation at a slow but sustained rate. A common remedy is to purge the insulation from within by jets, tubes, manifolds, etc. However, this is wasteful in terms of gas consumption, costly and inefficient. Another possible solution is the use of a closed cell, non-permeable thermal insulation. This insulation is not as effective in insulating the furnace, however, because it is not able to fill all voids, corners, seams, etc. and block gas movement. This type of insulation may also give off undesirable gases or fumes.

SUMMARY OF THE INVENTION

The present invention provides a modular furnace fabricated from at least one module containing any desired number of process zones, such as heating and cooling zones. The modular construction allows a furnace design to be readily changed during manufacture or in the field. More particularly, each module has a frame, a removable cover mounted to the frame, exterior cover panels on the frame, and an insulated case fastened to the interior of the module.

In another aspect of the invention, field replaceable universal blower assemblies are associated with each process zone, resulting in a reduction in weight and volume of replaceable components. Also, the motor shaft in each blower motor is provided with a sealed bearing that allows the motor to be mounted to the process chamber without additional shaft seals but still providing a gas tight connection. Insulation within each module is held in place by gas permeable fabric covering large vent openings in cover panels to allow oxygen to diffuse out of the insulation rapidly upon start up. In a further aspect, a cooling unit may be provided to cool gas heated by the product and return the cooled gas to the cooling zone.

DESCRIPTION OF THE DRAWINGS

The invention will be more fully understood from the following detailed description taken in conjunction with the accompanying drawings in which.

DETAILED DESCRIPTION OF THE INVENTION

Figure 1:
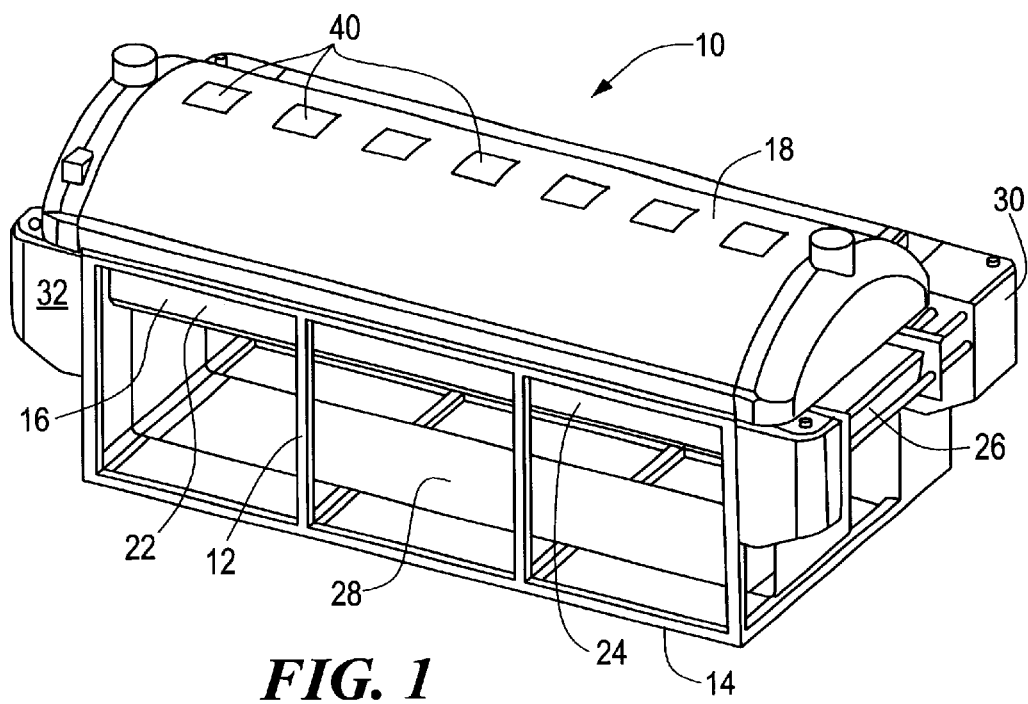
FIG. 1 is an isometric view of a modular furnace having one module according to the present invention.

Referring to FIGS. 1–5, a furnace 10 is fabricated from one or more individual modules 12. Each module comprises a structural frame 14, an interior case 16 fastened to the frame, and a removable cover 18, preferably hinged to the frame to tilt open. Exterior paneling 20 is provided over the frame and mounted to the frame or otherwise to the process chamber. See FIG. 2. The interior case 16, which defines a process area, is preferably provided as an upper case 22 within the cover 18 and a lower case 24 within the frame 14. A conveyor assembly 26 is provided with a conveyor belt 28 that extends the length of the furnace from an entry area 30 to an exit area 32. The conveyor belt 28 travels through a product area between the upper case 22 and the lower case 24 and returns near the bottom of the frame 14.

Figure 6:
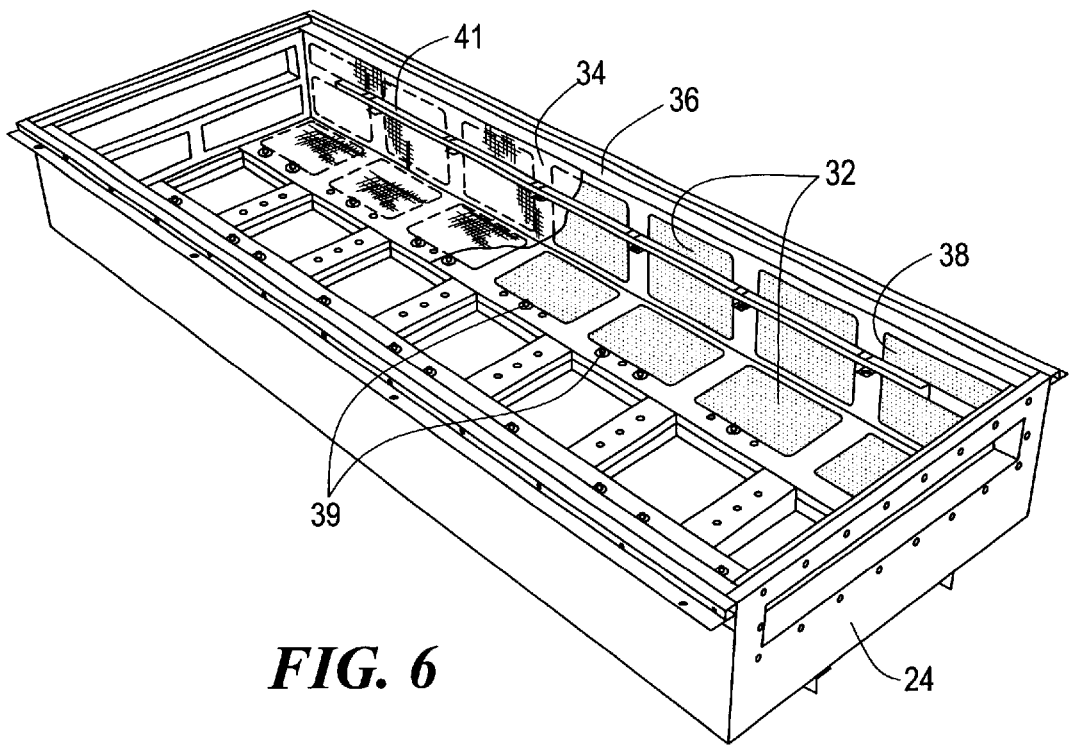
FIG. 6 is an isometric view of a lower case of the furnace of FIG. 1.
Figure 7:
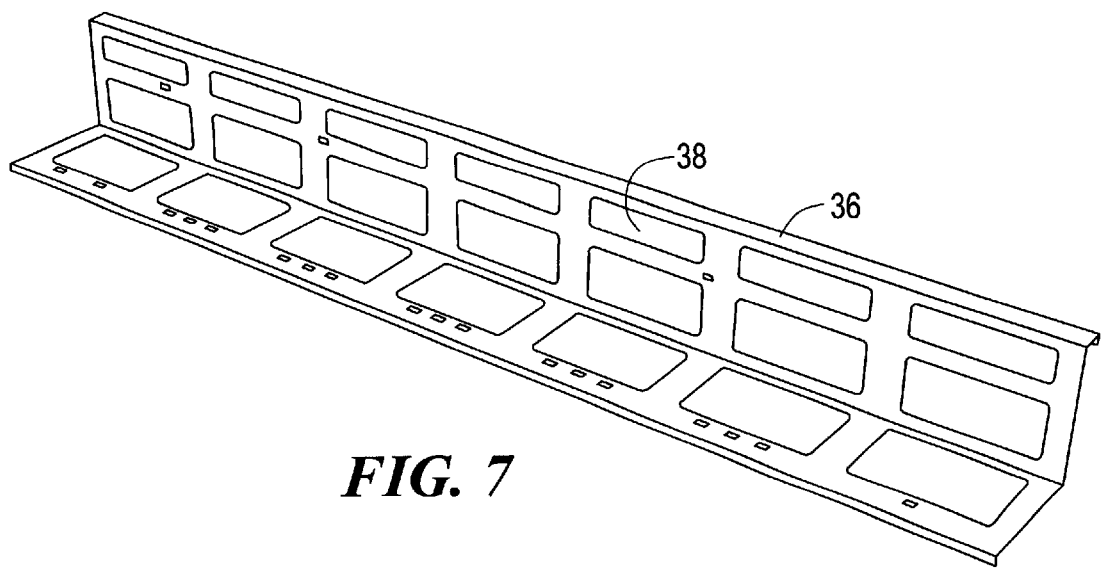
FIG. 7 is an isometric view of an insulation cover panel of FIG. 6.

Each case 16 is insulated with a suitable insulation held in place against the interior walls of the case. Referring to a lower case 24 illustrated in FIG. 6, insulation 32 is held in place against the interior walls by a layer of gas permeable, heat and fray resistant material 34 (partially illustrated in FIG. 6) fastened to a cover or panel 36 having large vent openings 38 therein. See also FIG. 7. In this manner, the insulation 32 within the case is open to the process chamber, while the material 34 prevents fibers or particles of insulation from contaminating the product. The material may be, for example, a fiberglass woven cloth. As noted above, it is difficult to purge $O_2$ from the insulation behind the prior art metal insulation covers. Thus, the vent openings 38 in the insulation covers 36 of the present invention, which should be as large as possible, ensure that there are minimal restrictions or obstacles to the diffusion of $O_2$ out of the insulation into the tunnel. The large, covered vent openings allow the purge down rate to be controlled by controlling the flow of incoming $N_2$ gas. The process can accordingly be optimized for all furnaces by adding a high flow in the beginning to rapidly displace the tunnel atmosphere, and then slowing the flow as the $O_2$ diffuses out of the insulation. The material may be held in place in any suitable manner, such as by fasteners 39 through the panel and/or by a bracket 41 extending along the panel. The material may be fastened on top of or beneath the panel.

Figure 2:
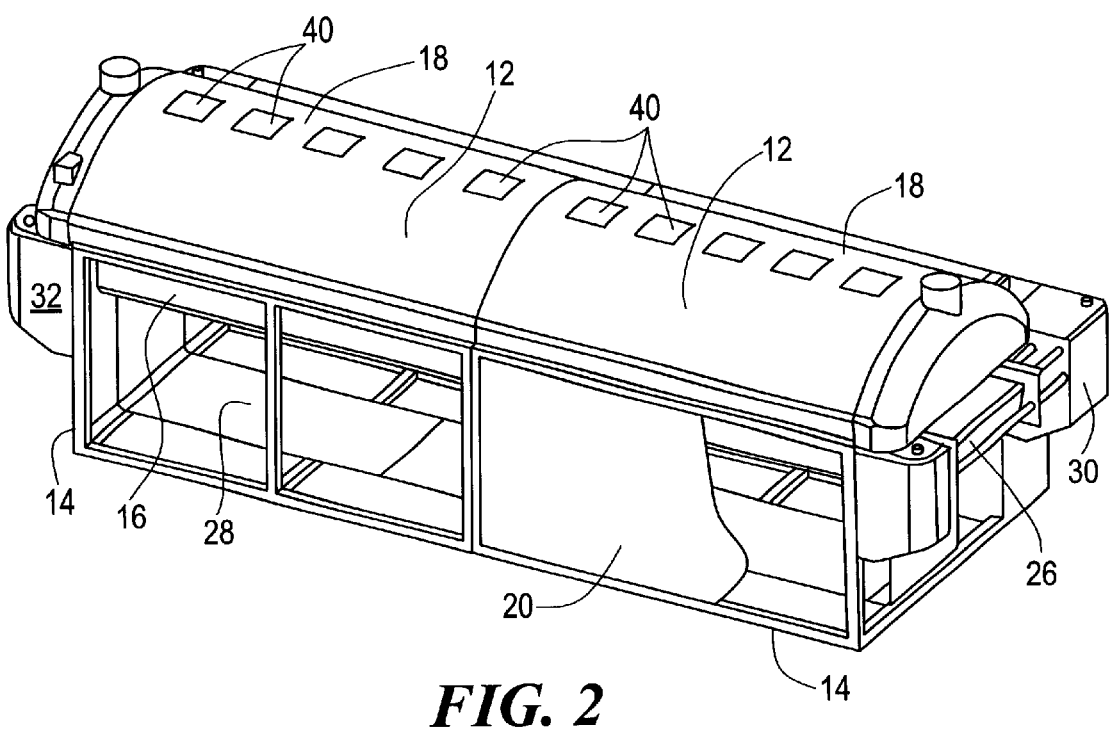
FIG. 2 is an isometric view of a modular furnace having two modules.
Figure 3:
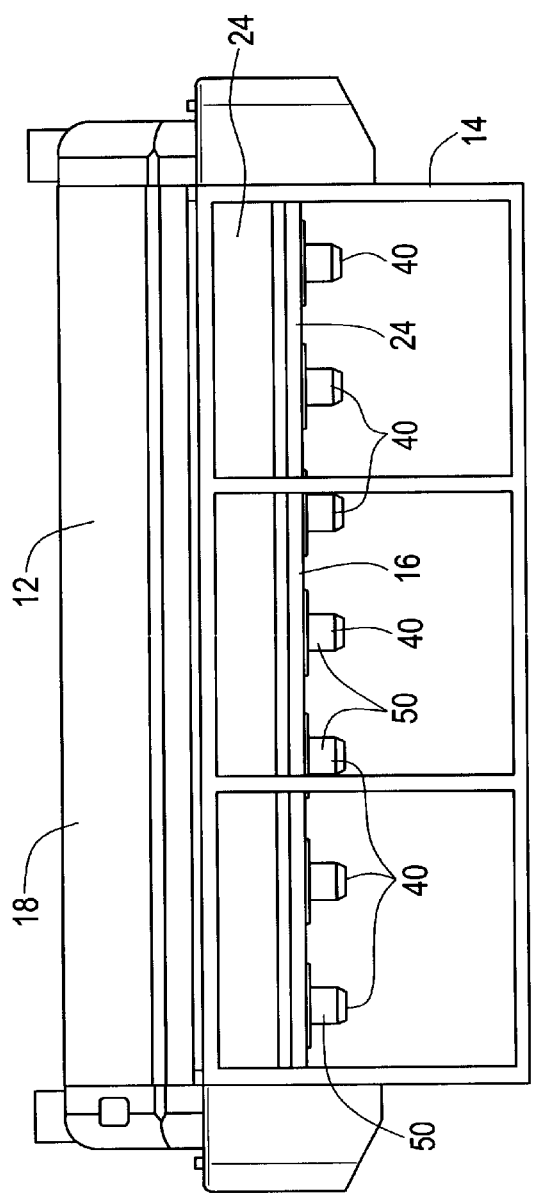
FIG. 3 is a front view of the furnace of FIG. 1.
Figure 4:
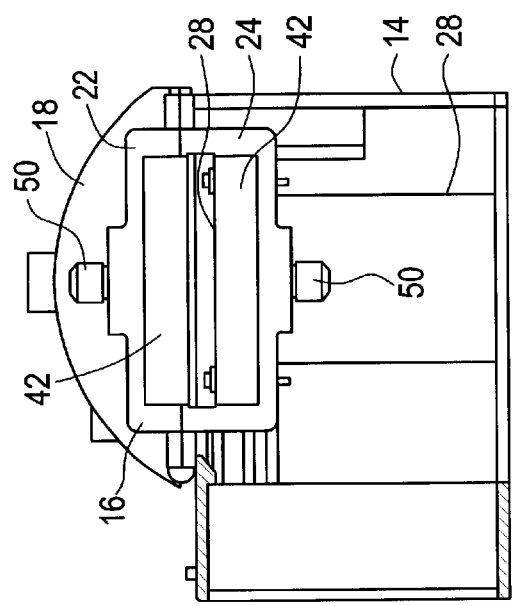
FIG. 4 is a side view of the furnace of FIG. 1.
Figure 5:
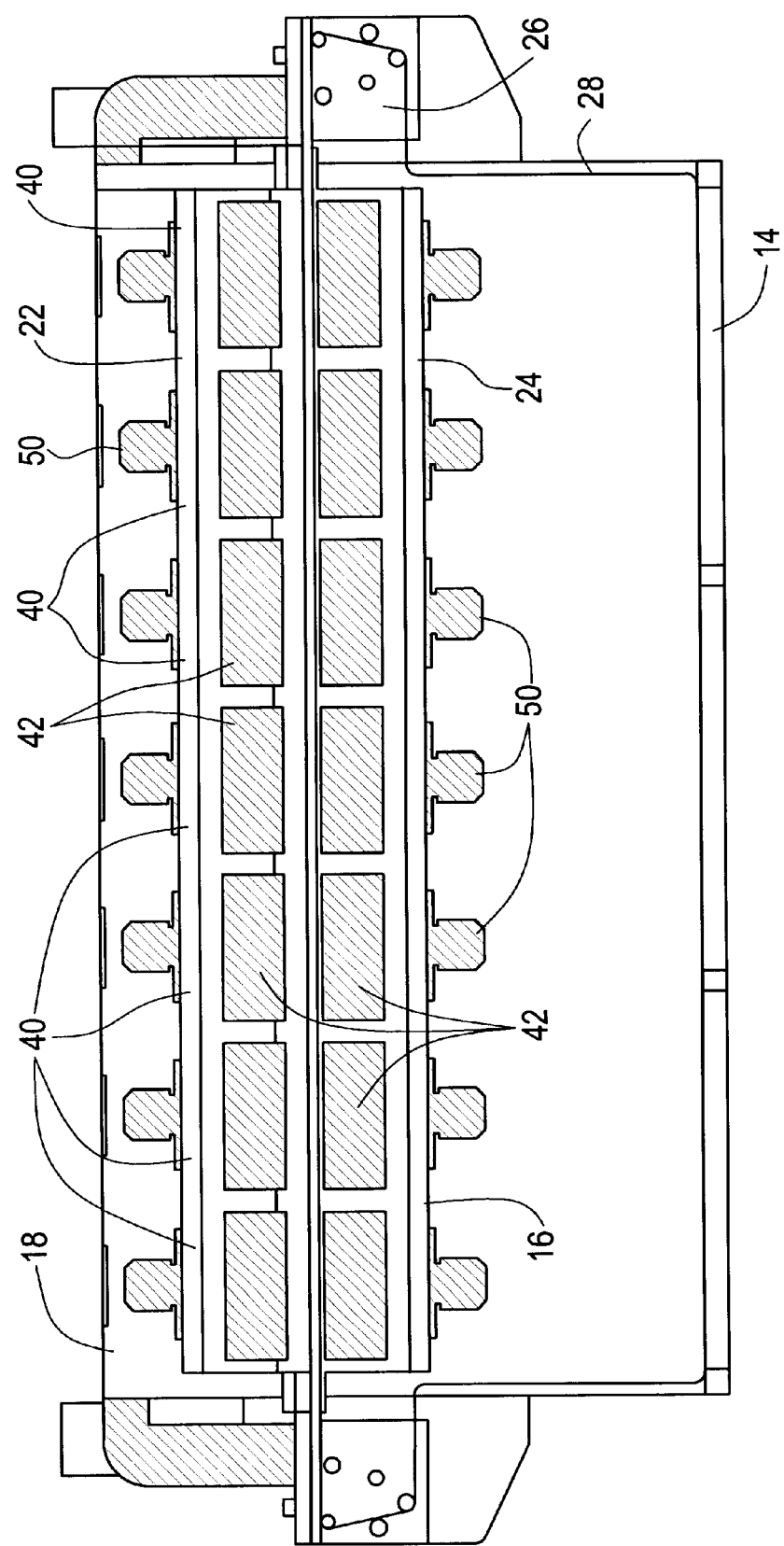
FIG. 5 is a cross-sectional view of the furnace of FIG. 1.

Any desired number of process zones 40, such as for heating, cooling, a combination or heating or cooling, or other functions, may be provided within each module. A desired zone is provided by installing an appropriate plenum box 42, blower assembly 50, and any other associated equipment in the module. Typically, an upper plenum box is installed in the upper case 22 and a lower plenum box is installed in the lower case 24, although only an upper plenum box or only a lower plenum box may be used if desired. For example, FIGS. 1 and 2–5 illustrate a furnace having one module 12 containing seven zones 40 implemented with seven upper plenum boxes and seven lower plenum boxes. FIG. 2 shows a furnace with two modules 12, each module containing five zones 40.

Each plenum box 42 may provide heating, cooling, or a special function, such as flux vapor removal, case venting, or idling. For example, a furnace may be designed with six heating zones and one cooling zone, which could be fabricated from six plenum boxes with the appropriate heating equipment and one plenum box with the appropriate cooling equipment. The appropriate heating or cooling equipment may be incorporated into the blower assembly or contained external to the process area and connected to the process area by ducts. During manufacture, the design of the furnace may be changed to five heating zones and two cooling zones. This change is readily accomplished by substituting the appropriate cooling equipment in the appropriate zone. Subsequently, in the field, the furnace may be retrofitted to have four heating zones and three cooling zones, again by substituting the appropriate cooling equipment in the appropriate zone. It will be appreciated that any combination of zones within a module and any number of modules may be provided, as determined by the particular application. It will also be appreciated that placing heating and cooling equipment in adjacent zones allows a wide range of thermal process parameters and great flexibility and range of thermal profiles.

Figure 8:
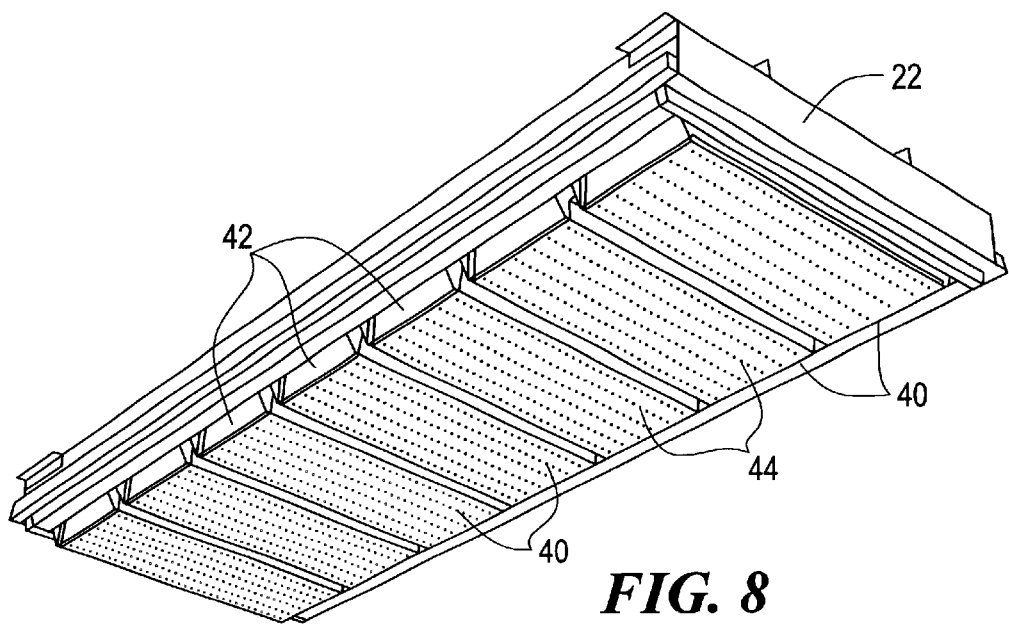
FIG. 8 is an isometric bottom view of an upper case containing plenum boxes of the furnace of FIG. 1.
Figure 9:
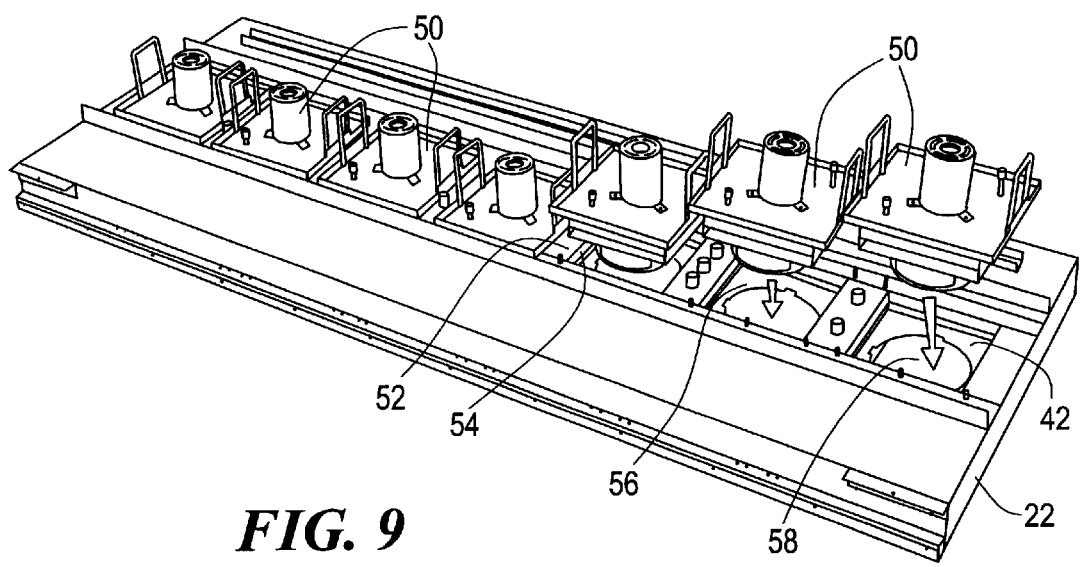
FIG. 9 is an isometric top view of the upper case of FIG. 8.

An upper case 22 is illustrated more fully in FIGS. 8 and 9. For simplicity, only the upper case and components associated therewith are discussed. It will be appreciated, however, that the lower case and components associated therewith are similar but reversed to direct the gas flow upwardly toward product on the conveyer. A number of plenum boxes 42 are integrally mounted to and within the case, such as with bolts. A lower surface of each plenum box comprises an orifice plate 44 having multiple small openings for accelerating the gas into multiple jets impinging on the product on the conveyor below the plenum box. If the plenum box is in a heating zone, a heating unit is contained within the plenum box, such that gas passes over the heating unit to be heated to a desired temperature and then through the openings in the orifice plate. The heated gas then impinges on the product.

A universal blower assembly 50 is provided in association with most or all of the plenum boxes 42 to move the gas through the plenum box to the product. Each blower assembly comprises a field replaceable unit that is sealingly mounted to an upper surface 52 of the case 22 and extends through an opening 54 therein. The blower assembly is also sealingly mounted to an upper surface 56 of the plenum box 42 and extends through an opening 58 therein. By sealing to the plenum box, the blower can produce a high pressure within the plenum box and a low pressure outside the plenum box causing gas to flow through the orifice plate and to circulate within the chamber. By minimizing the field replaceable unit to contain only a blower assembly, the field replaceable unit is approximately half the weight and a third of the size of a prior art hot air plenum field replaceable unit. The present field replaceable unit is accordingly easier to install and remove. The smaller size also makes the present field replaceable unit easier to ship and to store on site.

The universal blower assembly 50 of the present invention is able to perform the many functions typically required of blower assemblies in a furnace. For example, blower assemblies are used to circulate air over the heating elements and pressurize a plenum to deliver heated air to the product. Blower assemblies are also used to deliver a cooling airflow from a cooling unit outside the process chamber to the product and exhaust air that has been warmed by the product back to the cooling unit to be reprocessed. Blower assemblies may also deliver a certain amount of process chamber gas to a flux management or other external system and/or re-introduce air from a flux management or other external system into the process chamber, typically while also circulating heated air and pressurizing the plenum. A high-pressure blower assembly is used to deliver higher than standard levels of plenum pressurization. Higher pressure may be used, for example, to compensate for high altitude processing of PC boards or to accommodate non-standard customer process requirements.

Figure 10:
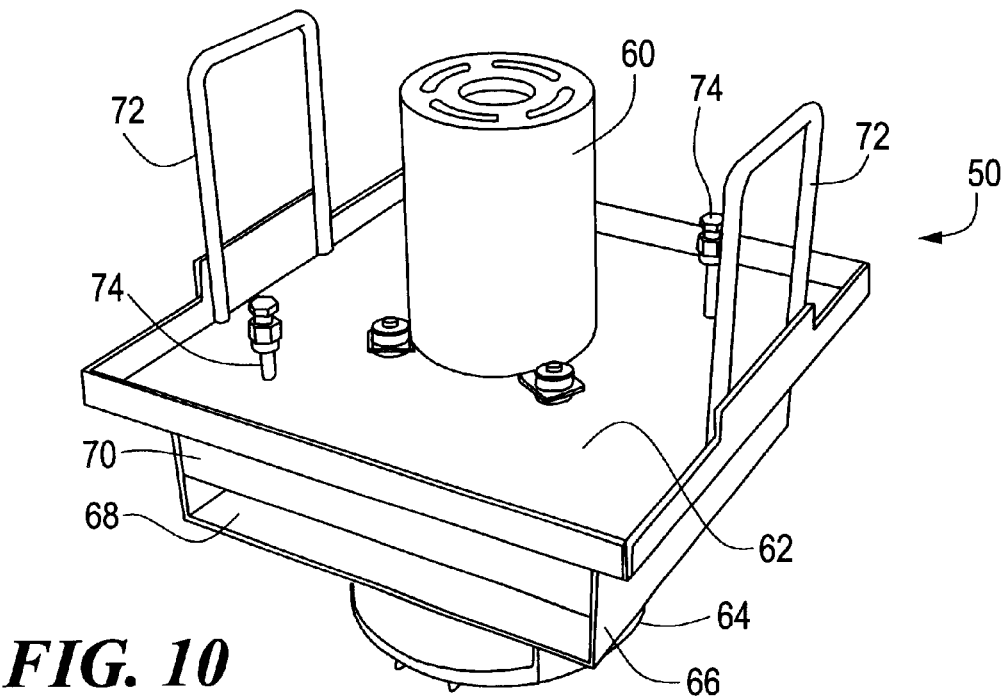
FIG. 10 is a field replaceable blower assembly according to the invention.

FIG. 10 illustrates a universal blower assembly 50 configured for recirculating gas through a heating zone. The blower assembly contains a blower motor 60 mounted to a sheet or plate 62 of, for example, metal. A barrier against the atmosphere is provided between the blower assembly and the case, for example, by a gasket on an undersurface of the plate 62 for sealing against the upper surface 52 of the case 22. A fan housing 64 containing an impeller and an air or gas intake housing 66 with an intake opening 68 therein are located below the plate 62. The fan housing 64 extends into the plenum box 42 through the opening 58 in the plenum box. A barrier against the higher pressure inside the plenum box is provided between the blower assembly and the plenum box, for example, by a gasket around an undersurface of the gas intake housing 66 that seals against the upper surface 56 of the plenum box. The blower motor 60 is sealed to the plate 62 to form a gas tight seal, as described further below. A layer of insulation is provided in the blower assembly in the region 70 above the air intake opening 68. One or more handles 72 may be included to make the unit easy to lift and install or remove. One or more ports 74 for measuring parameters such as pressure or composition of the atmosphere in the plenum box are provided through the sheet.

Figure 11:
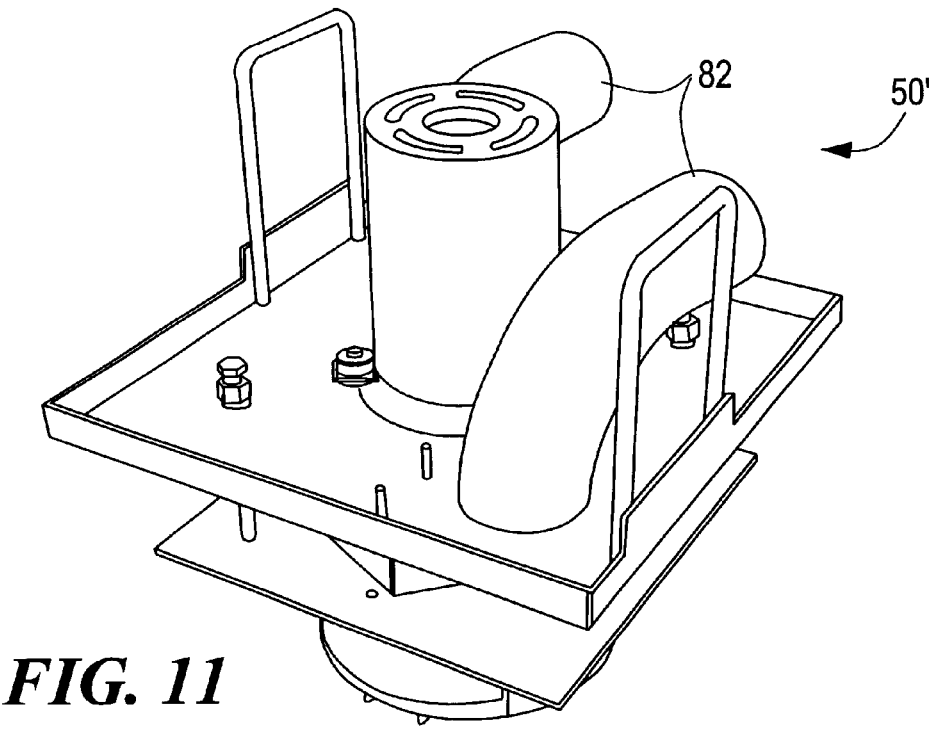
FIG. 11 is a further field replaceable blower assembly.
Figure 12:
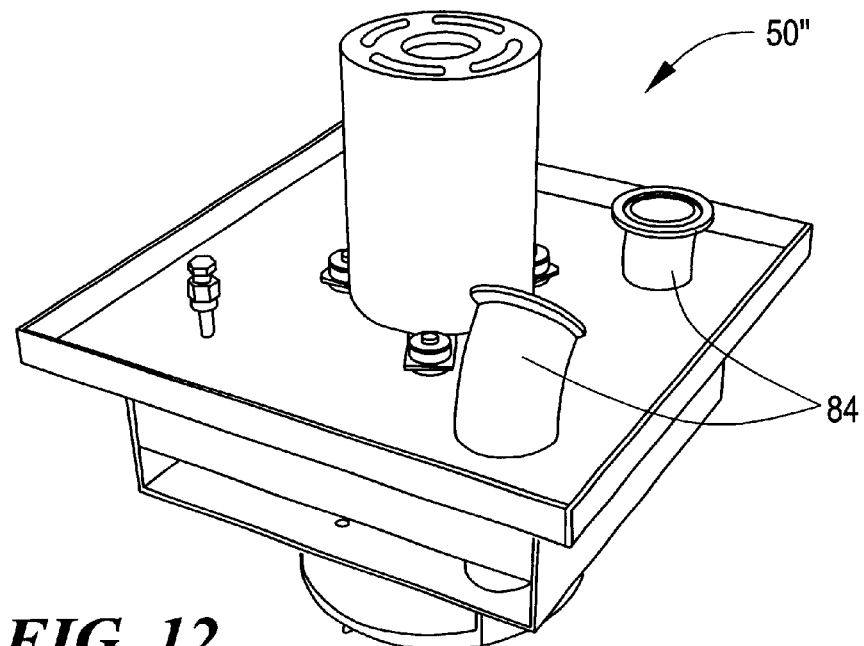
FIG. 12 is a still further field replaceable blower assembly.
Figure 13:
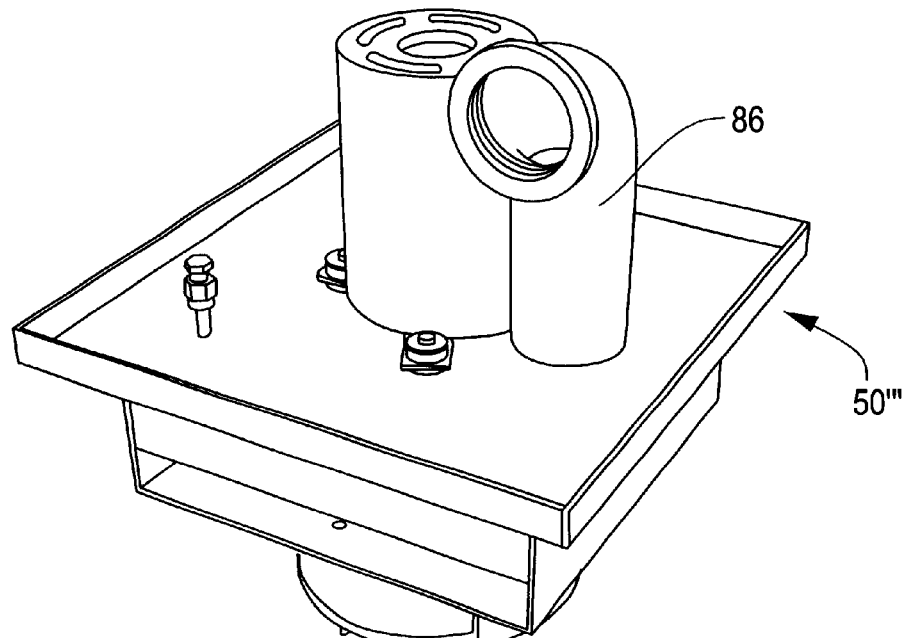
FIG. 13 is a still further field replaceable blower assembly.

A cold zone blower assembly 50' for use in a cooling zone of a furnace is illustrated in FIG. 11. This assembly includes ducting 82 to deliver air or gas to a remotely located cooling unit and to return air or gas from the cooling unit. A flux exhaust blower assembly 50" is illustrated in FIG. 12, in which ducting 84 is provided to deliver a certain amount of process chamber gas to a flux management system located outside of the process chamber and to return cleaned gas from the flux management system to the process chamber. FIG. 13 illustrates a blower assembly 50''' that allows gas from a flux management system to be reintroduced via ducting 86 into the process chamber, for example, into a different zone from which the gas was taken. The hot zone blower assembly 50 illustrated in FIG. 10 may also comprise a high pressure blower assembly, by, for example, inclusion of an appropriate impeller and running the motor at a higher speed.

Figure 14:
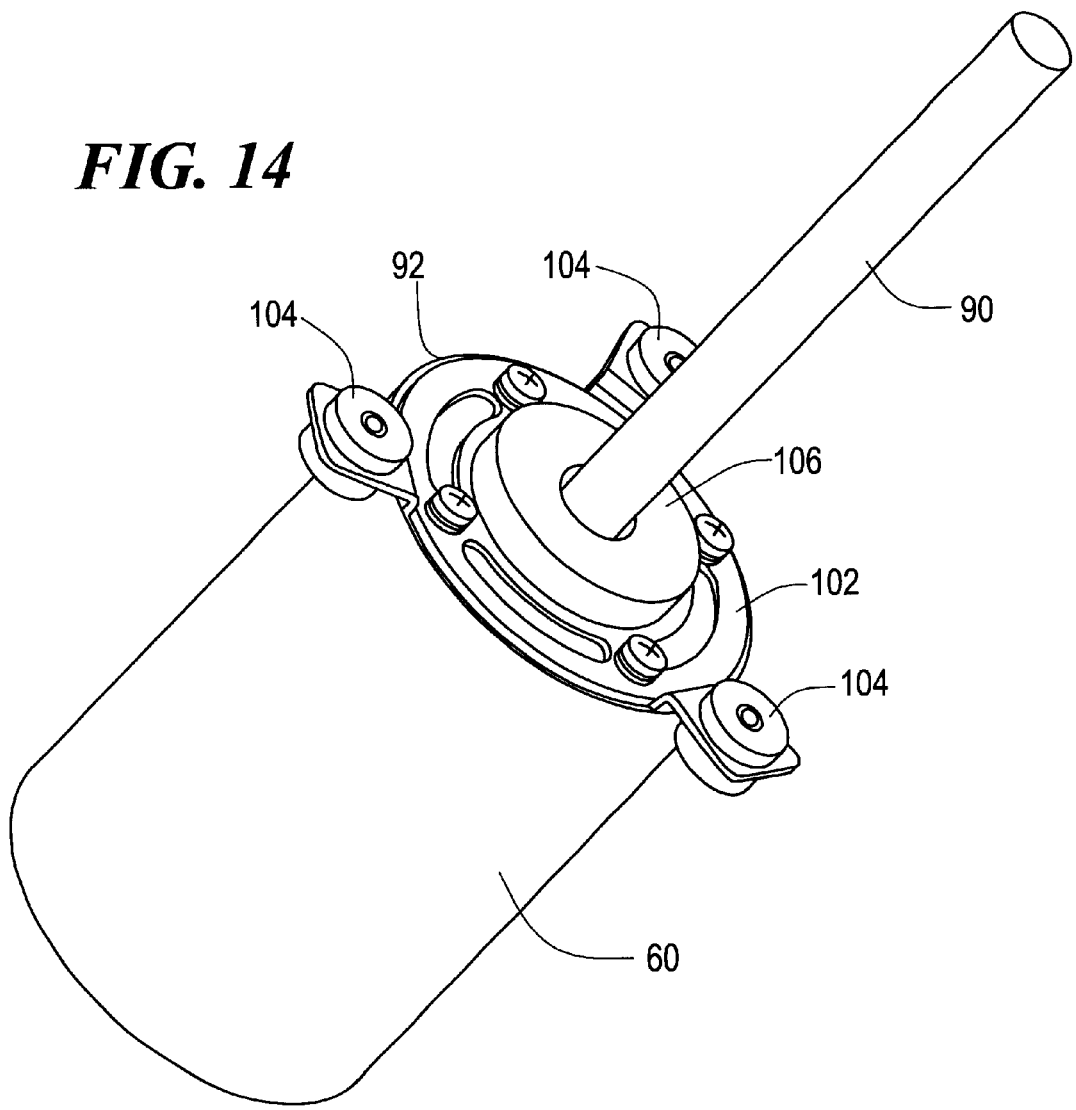
FIG. 14 is an isometric view of a motor and motor mount according to the present invention.
Figure 15:
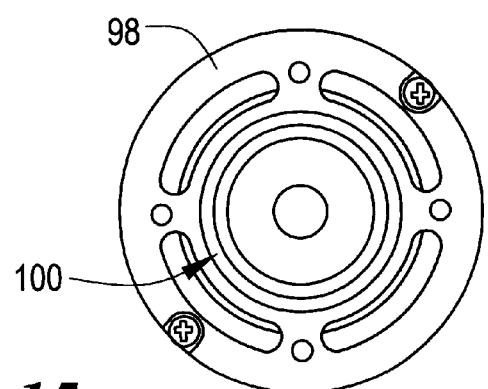
FIG. 15 is an end view of the motor of FIG. 14.
Figure 17:
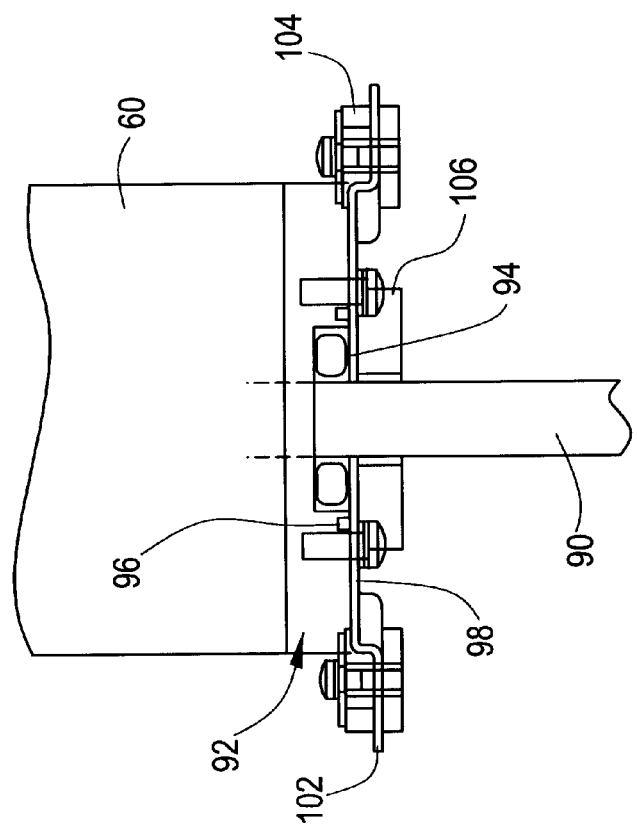
FIG. 17 is a partial view of the motor of FIG. 14.
Figure 16:
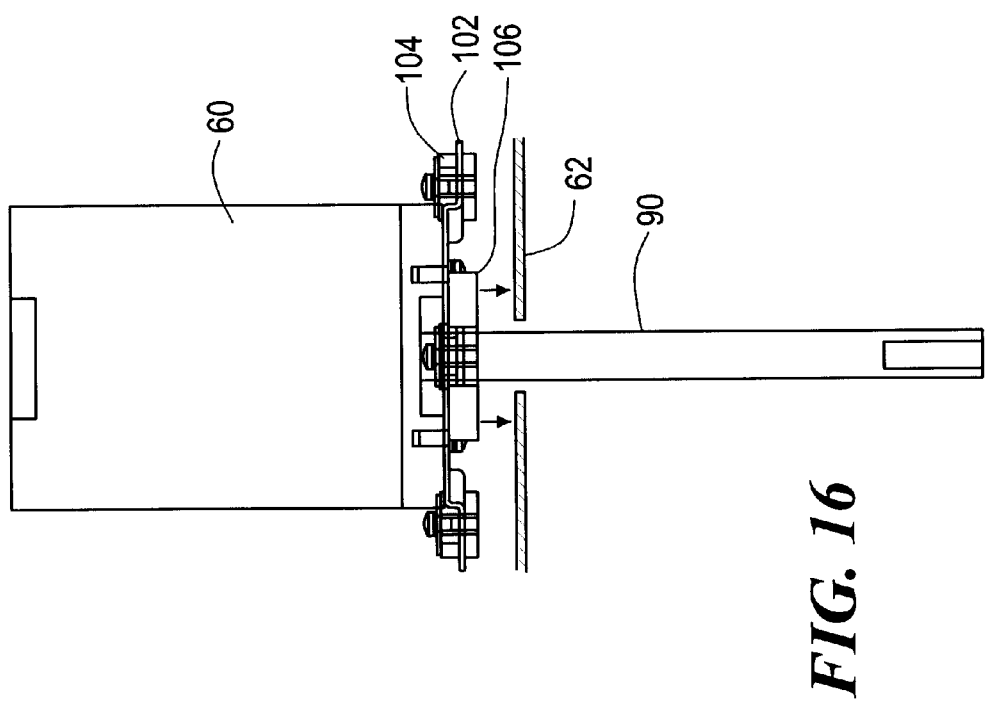
FIG. 16 is a side view of the motor of FIG. 14.

In solder reflow furnaces for printed circuit boards, nitrogen, $N_2$, is often used as an inerting gas to improve process yields. As a result, the reflow solder furnace must maintain a certain level of $N_2$ purity, with low oxygen, $O_2$, contamination and a minimal rate of $O_2$ leakage into the process chamber. Any mechanical penetration or seam in the process chamber is a potential leakage site. The blower motor shaft 90 (see FIG. 14) is one of the more difficult components to seal. Due to the heat of a furnace, the motor and any extra shaft seal must be on the outside of the process chamber or protected by insulation. Also, the motor shaft rotates from 1000 to 6000 rpm, which limits the types of seals that can be used.

The present invention provides a sealed motor bearing design that makes the motor gas tight and allows for it to be directly mounted to the process chamber or any other surface to which it should be sealed. Referring to FIGS. 14–17, the motor shaft 90 extends from the motor 60 in the housing through a motor end bell 92. A sealed shaft bearing 94 suitable for surrounding the rotatable shaft is provided within the motor end bell. For example, the sealed bearing comprises a sealed bearing of the type including two compliant rotating lip seals to contain lubricant and exclude dirt, contaminants, and low pressure fluids and gases. The bearing may be a ball bearing, a roller bearing, a bushing bearing, or another type of bearing. The inside diameter surface of the bearing is sealed to the motor shaft by an O-ring, sealing adhesive, or in any other manner to effect a gas tight seal between the inside diameter of the bearing and the motor shaft, with no rotational movement between the bearing and the shaft. The outside diameter surface of the bearing is sealed to the motor end plate with an O-ring, sealing adhesive, or in any other manner to effect a gas tight seal between the outside of the bearing and the housing in the motor end plate, with no rotational movement between the bearing and the motor end plate. The seal between the outer diameter surface of the bearing and the bearing housing in the motor end plate is sealed with a lubricated O-ring, so that the bearing may move in an axial direction within the motor end cap while maintaining a gas tight seal. For solder reflow furnace applications, the sealed bearing must be sealed against pressures of up to 4 inches water column, and preferably 8 inches of water column. A second seal 96 is provided between the face 98 of the end bell and a motor mounting bracket 102 or other surface for mounting the motor. The second seal may be, but is not limited to, an O-ring in a groove 100 on the end face 98, a layer of gasket material, or the application of sealing adhesive.

A compliant mounting of the motor 60 to absorb vibration and motion of the motor relative to the furnace enclosure is also provided. As noted above, the mounting bracket 102 is attached to the face 98 of the motor with the O-ring 96 on the face of the motor providing a positive gas seal to the bracket. The bracket 102 is then mounted to the plate 62 with elastic vibration isolation bushings 104 to allow vibrational movement of the motor and shaft. An elastic seal or compliant face gasket 106, such as a bellows or foam rubber material, is placed around and spaced from the shaft between the mounting bracket and the furnace enclosure to complete the seal. The vibration isolation bushings may also be fabricated directly on the motor, with the face gasket 106 then placed around and spaced from the shaft between the end face and the surface or furnace enclosure.

Figure 18:
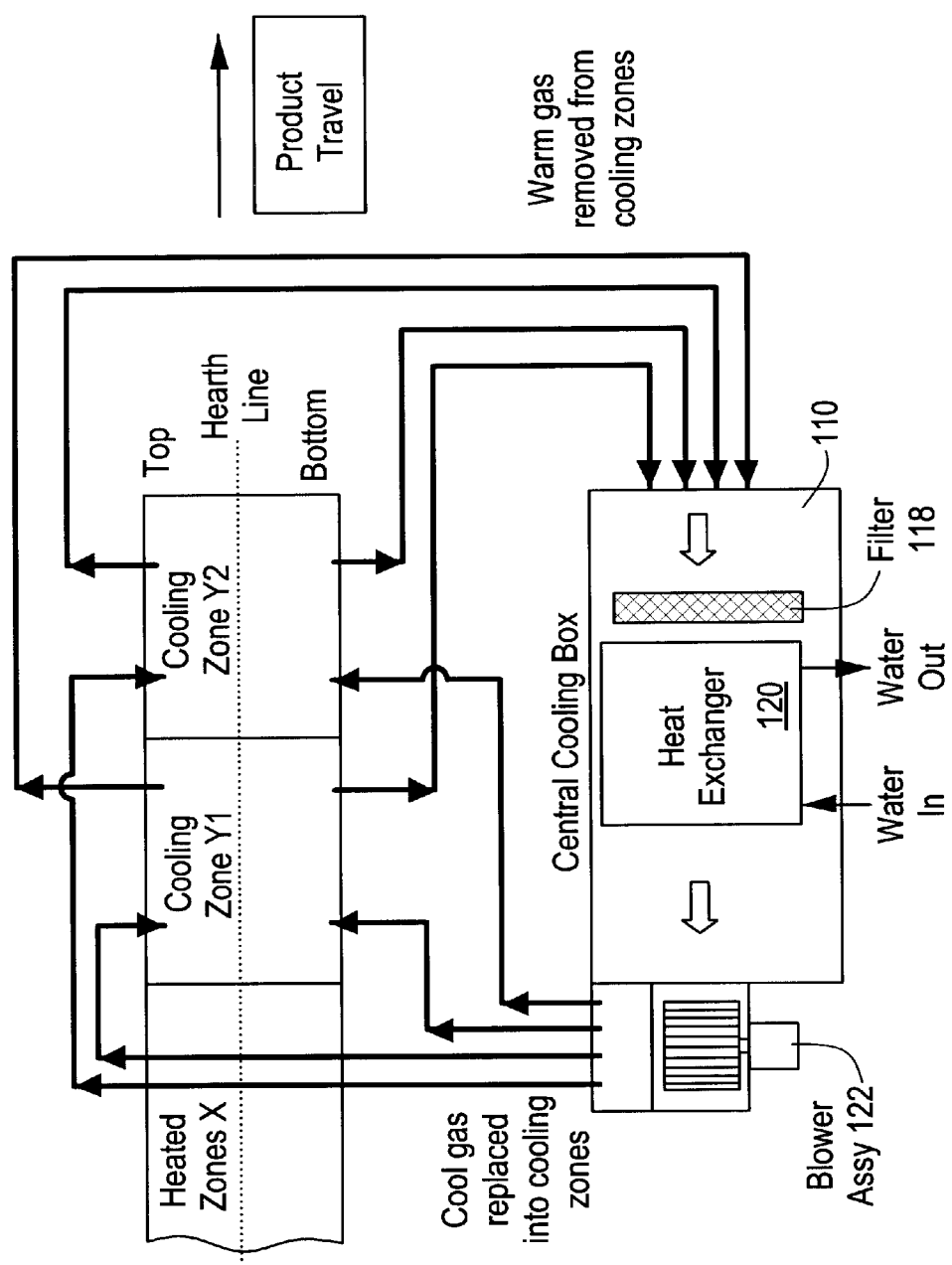
FIG. 18 is a schematic illustration of a furnace with a cooling unit.
Figure 19:
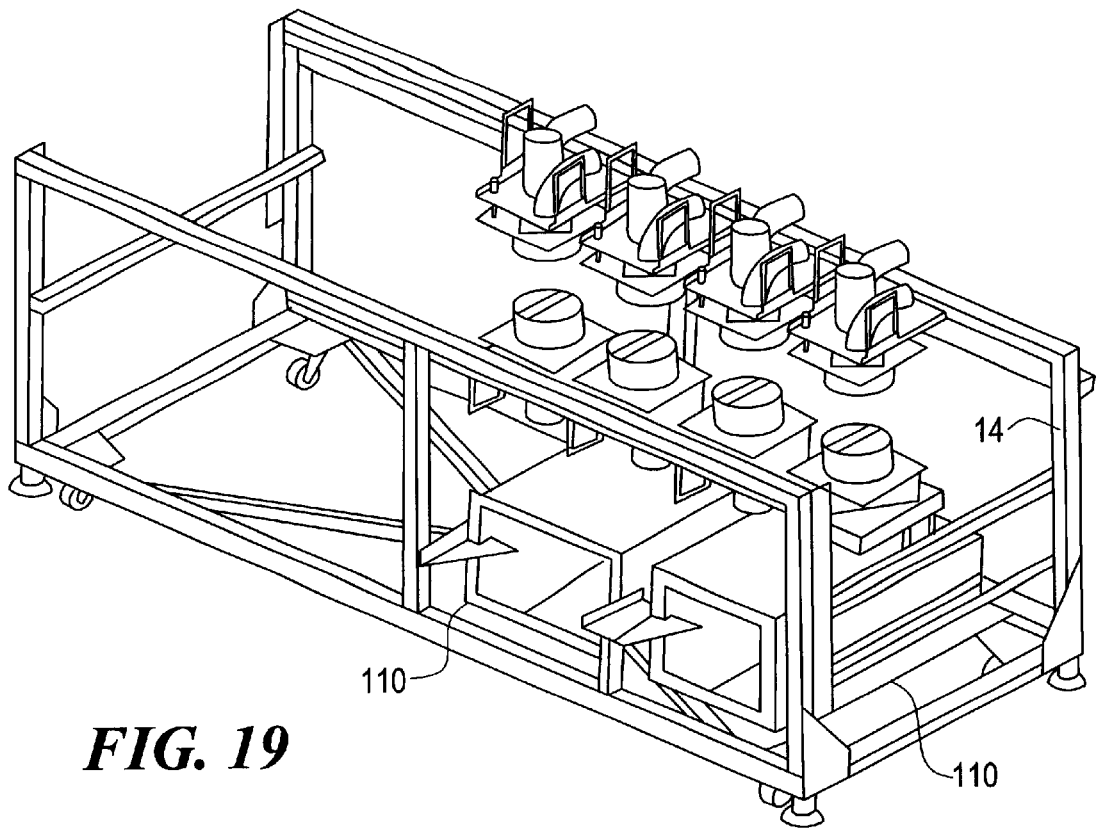
FIG. 19 is an isometric partial view of a furnace with two cooling units.
Figure 20:
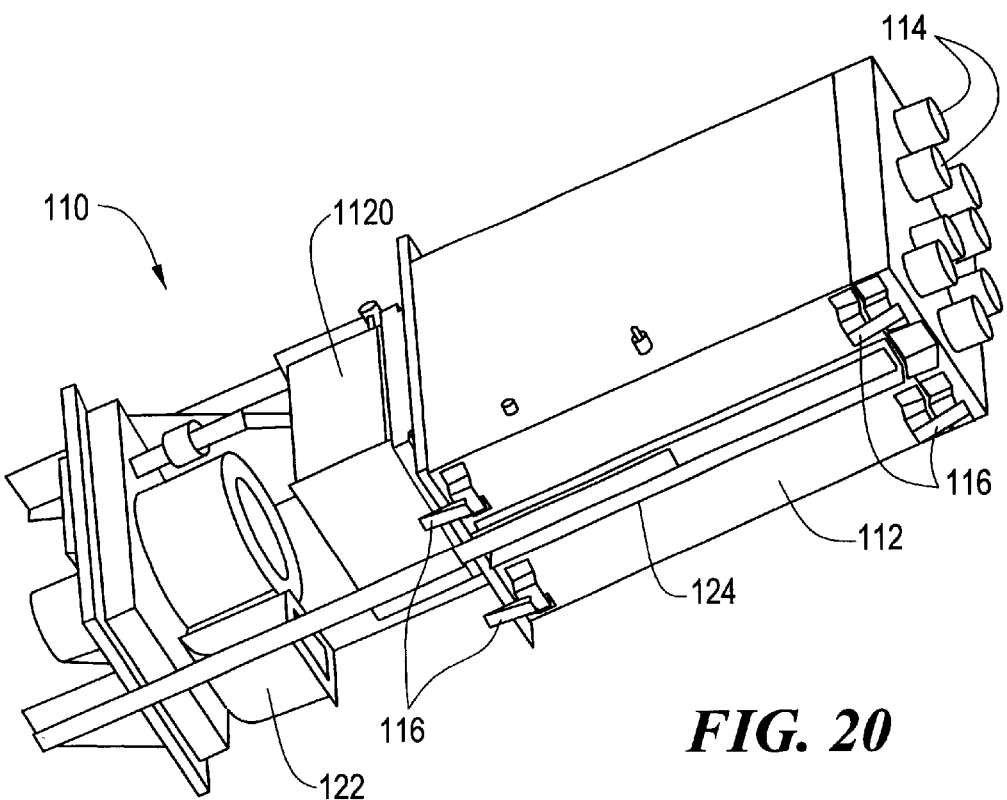
FIG. 20 is an isometric view of a cooling unit.
Figure 21:
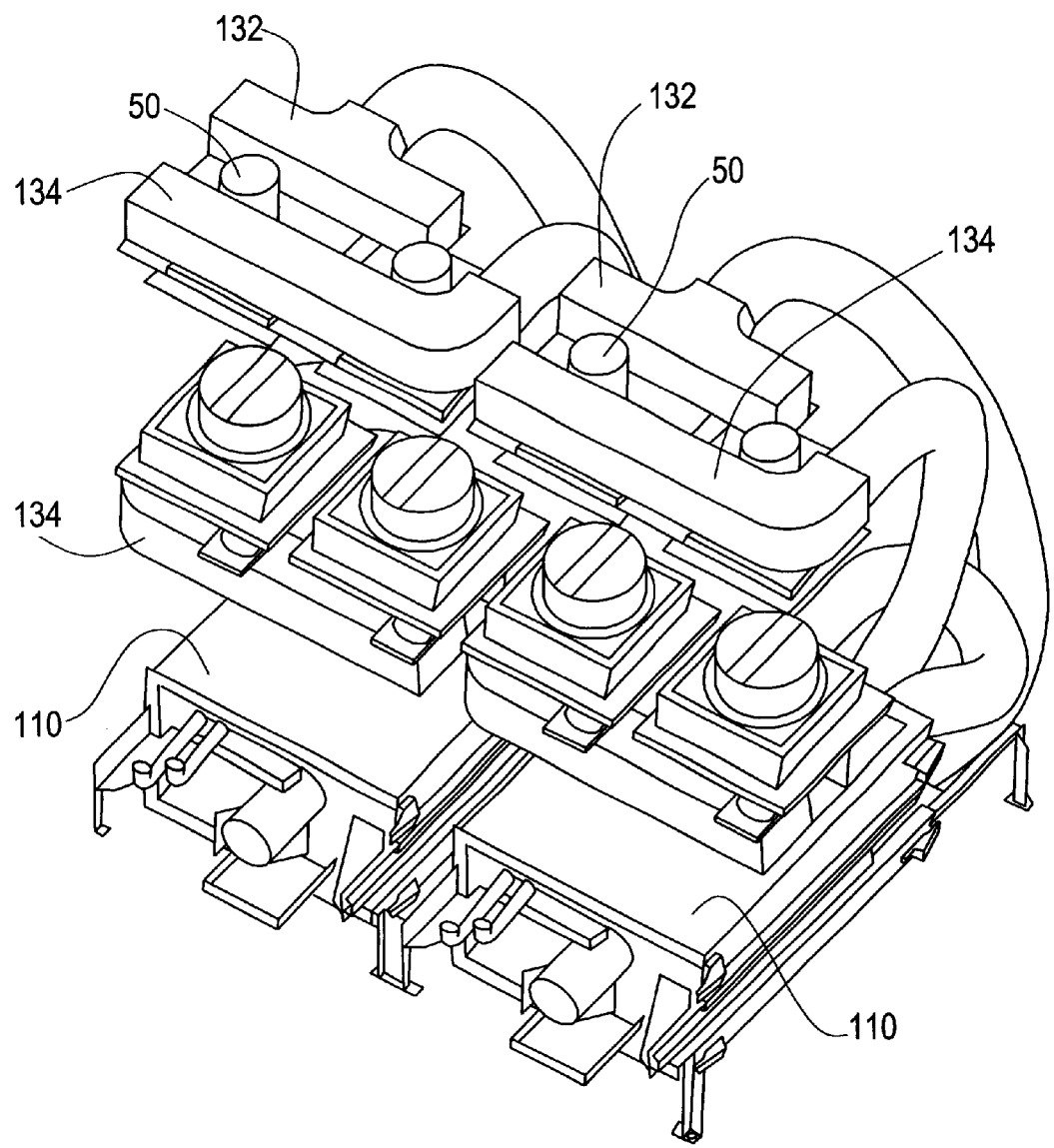
FIG. 21 is an isometric partial view of two cooling units and cooler blower assemblies with manifolds.
Figure 22:
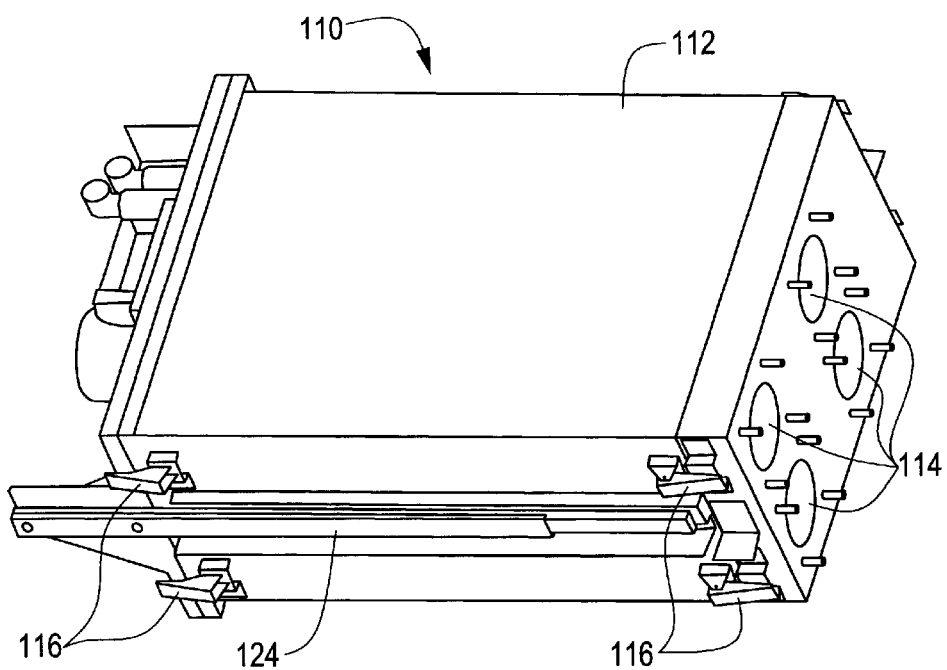
FIG. 22 is an isometric bottom view of a cooling unit of FIG. 21.

As noted above, convection furnaces for the reflowing of solder in the surface mounting of electronic devices to circuit boards, as well as other furnaces, incorporate cooling zones as part of the overall process. Cooling the circuit boards minimizes the time solder joints are above the melting point and consequently minimizes the occurrence of intermetallics in the joints, which would result in brittle solder joints. Referring to FIGS. 18–20, the present invention incorporates cooling units 110 that cool hot process gas and return the cooled gas to the process chamber to impinge directly onto the product. The cooling units fit into the furnace frame 14 below the process area and the lower plenum. The cooling unit includes a housing 112 having inlet ports 114, connected to ducting to the process chamber. Quick disconnect fittings 116 are provided to hold the unit together, so that the unit may be rapidly removed for maintenance or replacement. The unit may be mounted within the frame in any suitable manner, such as by rails along the side. A filter assembly 118, heat exchange unit 120, and blower unit 122 are located in the housing. These units are preferably provided on a sliding mount 124, so that they can be readily slid out for maintenance. The blower unit 122 is provided to return cooled gas back to the appropriate zone. For a water-cooled heat exchanger, a water leak detector is preferably provided in the cooling unit to detect water leaks in the system. Referring to FIGS. 21 and 22, manifolds 132, 134 may be employed at the universal blower assemblies 50 to combine flows, thereby minimizing the amount of ducting and the number of ports on the housing 112.

An open loop pressure control in the cooling zone may be provided to maintain high and low settings of static pressure in selected cooling plenums. The settings may be determined via software or hardware. The blower motors in the cooling zones automatically vary their speed by frequency controller or in another manner and maintain it after attaining the predetermined setting. This control helps ensure a fixed cooling rate over time. At a low setting, this control will reduce static pressure in the plenum, thus lowering the velocity of impinged gas onto the product, to keep components such as MELF and DCE applications from moving on the product.

A closed loop pressure control in the cooling zone may be used to maintain a limited static pressure range in selected cooling plenums, and may also be set via software. Under closed loop control, the blower motors in the cooling zones automatically vary their speed by frequency controller or in another manner and maintain the predetermined static plenum pressure. This control also helps ensure a fixed cooling rate over time. It can reduce static pressure in the plenum, thus lowering the velocity of the impinged gas onto the product, to keep components such as MELF and DCA applications from moving on the product. Pressure control is preferable to speed control, since speed control does not guarantee a specified pressure. The maintenance cycle is extended, especially the cleaning of flux off of the orifice plates in the cooling section.

The invention is not to be limited by what has been particularly shown and described except as indicated by the appended claims.

What is claimed is:

1. A furnace comprising:
    at least one module comprising a frame, a removable cover mounted to the frame, exterior cover panels on the frame, and an insulated case fastened to the interior of the module, the case defining a process area;
    a conveyor assembly disposed to extend through the process area in the insulated case from an entry area to an exit area to convey product through the process area;
    a plurality of process zones within the module, at least one plenum in each process zone disposed to direct a gas flow toward product in the process area; and
    at least one removable blower assembly removably and interchangeably disposed in at least one plenum, wherein the blower assembly is capable of providing heating or cooling or other processes to any process zone.

2. The furnace of claim 1, wherein the plenum includes an orifice plate disposed to diffuse a gas flow over the product area.

3. The furnace of claim 1, further comprising a second module comprising a second frame, a removable cover mounted to the second frame, exterior cover panels on the second frame, and a second insulated case fastened to the interior of the second module, the module and the second module fastened together with the conveyor assembly disposed to extend through the module and the second module from the entry area to the exit area, and the insulated case and the second insulated case fastened together to jointly define the process area, a plurality of process zones within the second module, at least one plenum in each process zone, and at least one blower assembly disposed in at least one plenum.

4. The furnace of claim 1, wherein the insulated case further comprises a gas permeable material covering and retaining an insulating material against interior walls of the insulated case.

5. The furnace of claim 4, wherein the gas permeable material comprises a fiberglass woven cloth.

6. The furnace of claim 4, wherein the gas permeable material is fastened to a cover having vent openings therein.

7. The furnace of claim 1, wherein the blower assembly is sealingly mounted through an opening in the case and through an opening in the plenum to move gas through the plenum.

8. The furnace of claim 1, further comprising at least a second removable blower assembly associated with each of the process zones.

9. The furnace of claim 1, wherein the blower assembly comprises a plate, a motor mounted on one side of the plate, an impeller in a fan housing mounted on another side of the plate and connected via a motor shaft to the motor, the plate sealingly mounted to the case.

10. The furnace of claim 1, wherein the blower assembly further comprises ducting to direct gas to and from an associated process zone.

11. The furnace of claim 9, wherein the motor includes a sealed bearing sealingly surrounding a motor shaft.

12. The furnace of claim 9, wherein the motor includes a further seal between an end plate of the motor and a motor mounting surface.

13. The furnace of claim 9, wherein the motor includes a compliant mount.

14. The furnace of claim 9, wherein the motor includes elastic mounting bushings.

15. The furnace of claim 9, wherein the motor includes an elastic seal surrounding and spaced from a motor shaft.

16. The furnace of claim 8, wherein the blower assembly includes lifting handles.

17. The furnace of claim 1, further comprising at least a cooling zone within the module comprising a sealed cooling plenum mounted to an interior of the case.

18. The furnace of claim 17, further comprising a cooling unit disposed within the frame, ducting between the cooling plenum and the cooling unit configured to draw gas to the cooling unit and to direct cooled gas from the cooling unit to the cooling plenum.

19. The furnace of claim 17, wherein the cooling unit further includes an air moving device.

20. The furnace of claim 17, wherein the cooling unit is mounted within the frame below the product area.

21. The furnace of claim 17, wherein the cooling unit includes quick disconnect fasteners for disassembly.

22. The furnace of claim 17, further comprising a heat exchanger within the cooling unit.

23. The furnace of claim 22, wherein the heat exchanger is slidably mounted within the cooling unit.

24. The furnace of claim 22, further comprising a water leak detector in the housing.

25. The furnace of claim 17, further comprising a filter assembly within the cooling unit.

26. The furnace of claim 1, further comprising a controller disposed to control processes within the process zones.

27. The furnace of claim 17, further comprising an open loop pressure control in the cooling zone.

28. The furnace of claim 17, further comprising a closed loop pressure control in the cooling zone.

29. The furnace of claim 1, wherein at least one process zone comprises a heating zone, the heating zone including a sealed heating plenum mounted to an interior of the case, and a heating assembly disposed within the plenum to direct heated gas to a product area on the conveyor assembly within the heating zone.

30. A furnace comprising:
- at least one module comprising a frame, a removable cover mounted to the frame, exterior cover panels on the frame, and an insulated case fastened to the interior of the module, the case defining a process area;
- a conveyor assembly disposed to extend through the process area in the insulated case from an entry area to an exit area to convey product through the process area;
- a plurality of process zones within the module, at least one zone comprising a cooling zone comprising a sealed cooling plenum mounted to an interior of the case; and
- a cooling unit disposed within the frame, ducting between the cooling plenum and the cooling unit configured to gas to the cooling unit and to direct cooled gas from the cooling unit to the cooling plenum.

31. The furnace of claim 30, wherein the cooling unit is mounted within the frame below the product area.

32. The furnace of claim 30, wherein the cooling unit further includes an air moving device.

33. The furnace of claim 30, further comprising a heat exchanger within the cooing unit.

34. The furnace of claim 30, wherein the heat exchanger is slidably mounted within the cooling unit.

35. The furnace of claim 30, further comprising a filter assembly within the cooling unit.

36. The furnace of claim 30, further comprising a water leak sensor connected to the heat exchanger.

37. The furnace of claim 30, wherein the cooling unit is configured to withdraw gas heated by product on the conveyor assembly to the cooling unit and to return cooled gas from the cooling unit to the cooling plenum.

* * * * *

UNITED STATES PATENT AND TRADEMARK OFFICE
CERTIFICATE OF CORRECTION

PATENT NO. : 6,394,794 B2
DATED : May 28, 2002
INVENTOR(S) : David Bloom et al.

It is certified that error appears in the above-identified patent and that said Letters Patent is hereby corrected as shown below:

<u>Title page,</u>
Item [75], Inventors, "Terrance Wong, Waban; Richard Tarczon, Bradford, both of MA (US);" should read -- Terrance Wong, Waban, MA (US); Richard Tarczon, Salem, NH (US); -- and <u>Column 10,</u>
Line 11, "claim 30" should read -- claim 33 --.

Signed and Sealed this

Twenty-ninth Day of July, 2003

JAMES E. ROGAN
*Director of the United States Patent and Trademark Office*